United States Patent Office 3,030,423
Patented Apr. 17, 1962

3,030,423
REACTION PRODUCTS OF ACETYLENES AND DECABORANE
Starling K. Alley, Beverly Hills, Calif., and Otto Fuchs, Tonawanda, N.Y., assignors to Olin Mathieson Chemical Corporation, a corporation of Virginia
No Drawing. Filed Feb. 13, 1959, Ser. No. 793,211
3 Claims. (Cl. 260—606.5)

This invention relates to solid products obtained by the reaction of acetylene or methylacetylene with decaborane.

The solid products of this invention, when incorporated with suitable oxidizers such as ammonium perchlorate, potassium perchlorate, sodium perchlorate, etc., yield solid propellants generally suitable for rocket power plants and other jet propelled devices. Such propellants burn with high flame speeds, have high heats of combustion, and are of the high specific impulse type. The products of this invention, when incorporated with oxidizers, are capable of being formed into a wide variety of grains, tablets, and shapes, all with desirable chemical and mechanical characteristics. Propellants produced by the methods described in this application burn uniformly without disintegration when ignited by conventional means, such as pyrotechnic type igniters. They are also mechanically strong enough to withstand ordinary handling.

Decaborane is a white crystalline solid having a melting point of 99.5° C. and a boiling point of 213° C. It can be prepared by the pyrolysis of diborane according to procedures well known in the art.

The solid reaction products of this invention are prepared by reacting decaborane with acetylene or methylacetylene in the presence of a catalytic amount of cuprous chloride. The ratio of reactants can be varied widely, generally being in the range of from 0.1 to 10 moles of acetylene hydrocarbon per mole of decaborane and preferably in the range of from 0.4 to 2.5 moles of acetylene hydrocarbon per mole of decaborane. The amount of cuprous chloride catalyst employed also can be varied widely, generally being in the range of from 0.005 to 0.5 mole of cuprous chloride per mole of decaborane and preferably from 0.01 to 0.2 mole of cuprous chloride per mole of decaborane. The reaction temperature can vary from 100 to 350° C. and preferably from 150 to 250° C. The pressure can vary from atmospheric pressure to about 700 p.s.i.g., although closed system reactions are usually conducted at about 100 to 600 p.s.i.g. The reaction generally requires about 1 to 10 hours depending upon the ratio of reactants and the temperature and pressure employed.

Although the reaction will proceed in the absence of a solvent, a solvent common for the reactants but inert with respect to the reactants under the reaction conditions is usually employed. Such solvents include aliphatic hydrocarbon solvents such as n-pentane, hexane and heptane, aromatic hydrocarbon solvents such as benzene, toluene and xylene, and cycloaliphatic solvents such as cyclohexane and methylcyclopentane. The amount of solvent can vary widely, but is generally within the range of about 1 to 10 moles of solvent per mole of decaborane.

The process of the invention is illustrated in detail by the following examples which are to be considered not limitative.

EXAMPLE I

A 250 cc. autoclave equipped with a solenoid-actuated reciprocating agitator was charged with 20 grams of decaborane, 50 ml. of benzene, and 3 grams of cuprous chloride. The autoclave was closed and swept with nitrogen, the solution was saturated with acetylene, and then the autoclave was pressured to 275 p.s.i.g. with acetylene. As the temperature was increased from 30° C. to about 150° C. the pressure rose to a maximum of 610 p.s.i.g. and then began to diminish gradually to 280 p.s.i.g. after about 5 hours. Heating was then discontinued and after cooling the pressure had dropped to 130 p.s.i.g. At the end of the reaction period, the autoclave was flushed with nitrogen and opened in a dry box. The contents of the

*Table I*
REACTION OF DECABORANE WITH ACETYLENE IN CLOSED SYSTEMS

| | | | Reaction | | | | | Product | | | | |
|---|---|---|---|---|---|---|---|---|---|---|---|---|
| | | | Pressure p.s.i.g. | | | | | | | | Analysis | | |
| Example No. | $B_{10}H_{14}$, g. | Catalyst, $Cu_2Cl_2$, g. | Initial [a] | Maximum | Final [b] | Temp., °C. | Time, hr. | Solvent Benzene, ml. | Physical Description | Burning Test | Percent B | Percent C | Percent H |
| I | 20 | 3.0 | 185 | 505 | 35 | 150 | 5.0 | 50 | Gray glass with conchoidal fracture. | Vigorous green flame. | 62.1 | 15.8 | 10.0 |
| II | 20 | 2.0 | 250 | 590 | 105 | 160 | 3.0 | 50 | Gray brittle solid | Extremely vigorous green flame. | 59.0 | 18.7 | 9.7 |
| III | 20 | 4.0 | 255 | 515 | 180 | 160 | 5.5 | 50 | Black glass with conchoidal fracture. | Very vigorous; green flame. | 42.8 | 25.3 | 8.2 |
| IV | 20 | 1.0 | 275 | 610 | 130 | 160 | 5.5 | 0 | Viscous black liquid changed to black elastic solid. | Vigorous green flame. | 45.0 | 18.9 | 6.2 |
| V | 10 | 0.5 | 220 | 550 | 105 | 160 | 5.5 | 25 | Black glass with conchoidal fracture. | Very vigorous; green flame. | 64.0 | 12.3 | 10.4 |
| VI | 20 | 2.0 | 250 | 360 | 210 | 220 | 1.5 | [c] 40 | Black liquid changed brown solid. | | 40.3 | 24.3 | 7.5 |
| VII | 20 | 2.0 | 250 | 525 | 300 | 240 | 1.0 | [c] 40 | Black liquid changed brown solid. | | 46.0 | 26.6 | 8.2 |
| VIII | 10 | 1.0 | 150 | 240 | 40 | 160 | 9.0 | 25 | Amber glass with conchoidal fracture. | | 82.7 | 2.9 | 11.3 |
| IX | 10 | 3.0 | 185 | 470 | 80 | 160 | 9.0 | 25 | Dark brown solid. | | 38.9 | 23.1 | 7.6 |
| X | 20 | 2.0 | 250 | 585 | 210 | 150 | 5.0 | 50 | Brown solid | | 42.8 | 14.7 | 7.6 |
| XI | 20 | 2.0 | 275 | 610 | 175 | 150 | 5.0 | 50 | ----do---- | | 35.0 | 16.4 | 6.4 |
| XII | 20 | 2.0 | 220 | 545 | 155 | 160 | 3.0 | 50 | Black solid | | 55.9 | 18.6 | 8.7 |
| XIII | 20 | 0.5 | 200 | 500 | 180 | 160 | 4.5 | 50 | Brown solid | | 65.2 | 17.7 | 9.6 |
| XIV | 20 | 0.5 | 205 | 500 | 170 | 160 | 4.5 | 50 | ----do---- | | 41.9 | 10.4 | 7.6 |

[a] Solution was saturated with acetylene, and then pressurized with acetylene to the initial pressure shown.
[b] Final pressure after cooling to room temperature.
[c] Toluene.

autoclave were transferred to a flask and the benzene was distilled off while the flask was immersed in an oil bath maintained at 70° C., first at atmospheric pressure, then at a reduced pressure of about 20 mm. of Hg absolute. The residue was a gray glass like solid having the characteristics described in Table I.

Examples II through XIV of Table I were performed in a similar manner.

The boron-containing solid materials produced by the method of this invention can be employed as ingredients of solid propellant compositions in accordance with general procedures which are well-understood in the art, inasmuch as they are readily oxidized using conventional solid oxidizers, such as ammonium perchlorate, potassium perchlorate, sodium perchlorate, lithium perchlorate, aluminum perchlorate, ammonium nitrate and the like. In formulating a solid propellant composition employing the solid materials produced in accordance with the present invention, generally from 10 to 35 parts by weight of the solid material and from 65 to 90 parts by weight of oxidizer, such as ammonium perchlorate, are present in the final propellant composition. In the propellant, the oxidizer and the solid material of the present process are formulated in intimate admixture with each other, as by finely subdividing each of the materials separately and thereafter intimately admixing them. The purpose in doing this as the art is aware, is to provide proper burning characteristics in the final propellant. In addition to the oxidizer and the oxidizable organoboron solid material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

We claim:

1. A process for the preparation of a solid reaction product of a material selected from the class consisting of acetylene and methylacetylene and decaborane which comprises reacting said material and decaborane in the presence of a catalytic amount of cuprous chloride at a temperature of from about 100° to 350° C. and at a pressure of from about 100 to 700 p.s.i.g.

2. A process for the preparation of a solid reaction product of acetylene and decaborane which comprises reacting acetylene and decaborane in amounts of about 0.1 to 10 moles of acetylene per mole of decaborane in the presence of about 0.005 to 0.5 mole of cuprous chloride per mole of decaborane at a temperature of from about 100° to 350° C. and at a pressure of from about 100 to 700 p.s.i.g.

3. The product produced by the process of claim 2.

References Cited in the file of this patent

Carpenter: ARS Journal, vol. 29, pp. 8–14 (January 1959).